(12) United States Patent
Harrigan

(10) Patent No.: US 9,284,048 B2
(45) Date of Patent: Mar. 15, 2016

(54) GLOBAL AIRFRAME HEALTH CHARACTERIZATION

(71) Applicant: Sikorsky Aircraft Corporation, Stratford, CT (US)

(72) Inventor: Matthew Harrigan, Horseheads, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 9 days.

(21) Appl. No.: 14/053,061

(22) Filed: Oct. 14, 2013

(65) Prior Publication Data

US 2015/0105970 A1   Apr. 16, 2015

(51) Int. Cl.
*B64C 27/00* (2006.01)
*B64F 5/00* (2006.01)
*F16F 1/00* (2006.01)

(52) U.S. Cl.
CPC ............ *B64C 27/001* (2013.01); *B64F 5/0045* (2013.01); *F16F 1/00* (2013.01); *B64C 2027/004* (2013.01)

(58) Field of Classification Search
None
See application file for complete search history.

(56) References Cited

U.S. PATENT DOCUMENTS

| | | | |
|---|---|---|---|
| 5,195,046 A * | 3/1993 | Gerardi et al. | 702/35 |
| 5,219,143 A | 6/1993 | Staple et al. | |
| 5,383,133 A | 1/1995 | Staple | |
| 5,853,144 A | 12/1998 | Vincent | |
| 6,006,163 A * | 12/1999 | Lichtenwalner et al. | 702/36 |
| 6,467,723 B1 | 10/2002 | Rossetti et al. | |
| 7,857,255 B2 | 12/2010 | Pancotti et al. | |
| 7,925,455 B2 * | 4/2011 | Pado et al. | 702/36 |
| 8,267,652 B2 | 9/2012 | Jolly et al. | |
| 8,831,895 B2 * | 9/2014 | Hedl et al. | 702/39 |
| 2002/0153451 A1 | 10/2002 | Kiss et al. | |

(Continued)

FOREIGN PATENT DOCUMENTS

EP   0407179   1/1991

OTHER PUBLICATIONS

Heverly II, "Optimal Actuator Placement and Active Structure Design for Control of Helicopter Airframe Vibrations," Department of Mechanical and Nuclear Engineering, Pennsylvania State University, 2002, [retrieved on Dec. 16, 2014] retrieved from the Internet: <URL:http://www.engr.psu.edu/rcoe/theses/Heverly.pdf>, 99 pages.

(Continued)

*Primary Examiner* — Rami Khatib
*Assistant Examiner* — David Merlino
(74) *Attorney, Agent, or Firm* — Cantor Colburn LLP

(57) ABSTRACT

According to one aspect, a controller, including a processor, sets an initial vibration frequency to be applied to an airframe. The controller commands one or more force generators to apply a vibratory load to the airframe at the initial vibration frequency. The controller determines a vibration response of the airframe at the initial vibration frequency using sensors. The controller sweeps through a range of vibration frequencies to be applied to the airframe. The one or more force generators are commanded to apply a plurality of vibratory loads to the airframe over the range of vibration frequencies. The controller determines a range of vibration responses of the airframe over the range of vibration frequencies using the sensors. A global stiffness of the airframe is determined based on the vibration response and the range of vibration responses. The controller reports results of the determined global stiffness of the airframe.

12 Claims, 5 Drawing Sheets

(56) References Cited

U.S. PATENT DOCUMENTS

| | | | |
|---|---|---|---|
| 2004/0050999 A1* | 3/2004 | Hill et al. | 244/17.27 |
| 2007/0034009 A1* | 2/2007 | Pado | 73/579 |
| 2008/0011091 A1* | 1/2008 | Weldon, Jr. | 73/766 |
| 2011/0245999 A1 | 10/2011 | Kordonowy | |
| 2011/0303784 A1* | 12/2011 | Heverly et al. | 244/17.13 |
| 2012/0310449 A1 | 12/2012 | Hinnant, Jr. et al. | |

OTHER PUBLICATIONS

International Application No. PCT/US2014/060353 International Search Report and Written Opinion dated Jan. 23, 2015, 12 pages.

James, "Aerostructural Shape and topology Optimization of Aircraft Wings," Graduate Dept. of Institute for Aerospace Studies, University of Toronto, 2012, [retrieved on Dec. 16, 2014] retrieved from the internet: <URL https://tspace.library.utoronoto.ca/bitstream/1807/32745/3/James_Kai_A_201206_PhD_thesis.pdf>, 100 pages.

Kindervater, et al., "Crash and Impact Simulation of Aircraft Structures—Hybrid and FE based Approaches," European Congress on Computational Methods in Applied Sciences and Engineering, ECCOMAS 2000, Barcelona, Sep. 11-14, 2000, [retrieved on Dec. 16, 2014] retrieved from the internet: <URL:http://congress.cimne.com/eccomas/eccomas2000/pdf/836.pdf>, 24 pages.

* cited by examiner

GLOBAL AIRFRAME HEALTH CHARACTERIZATION

BACKGROUND OF THE INVENTION

Environmental conditions associated with the operation of an aircraft may impose stress or strain on the aircraft. For example, a rotor hub associated with a rotorcraft may experience vibratory loads caused by aerodynamic forces on the blades. The blade loads may be summed at the hub and, if not attenuated, may be propagated through the rotor shaft and main transmission into the airframe.

An approach to controlling fuselage vibration has involved the use of hub-mounted passive absorbers tuned to attenuate the dominant rotating system vibration frequency, as well as active vibration control (AVC) system actuators throughout the fuselage. AVC systems are typically used in flight to actively attenuate particular vibration frequencies. AVC systems can include accelerometers configured to provide vibration data feedback related to targeted frequencies to be attenuated by AVC actuators. Separately, aircraft can include health and usage monitoring systems (HUMS) with accelerometers for drivetrain monitoring. Other aircraft subsystems can also include accelerometers associated with particular functions, such as a rotor track and balance (RTB) subsystem of a rotorcraft. The various accelerometers on an aircraft can provide localized vibration information but may not collectively provide a complete global assessment of the aircraft.

BRIEF DESCRIPTION OF THE INVENTION

An embodiment is directed to a method that includes setting, by a controller including a processor, an initial vibration frequency to be applied to an airframe. The controller commands one or more force generators to apply a vibratory load to the airframe at the initial vibration frequency. The controller determines a vibration response of the airframe at the initial vibration frequency using a plurality of sensors. The controller sweeps through a range of vibration frequencies to be applied to the airframe. The one or more force generators are commanded to apply a plurality of vibratory loads to the airframe over the range of vibration frequencies. The controller determines a range of vibration responses of the airframe over the range of vibration frequencies using the plurality of sensors. A global stiffness of the airframe is determined based on the vibration response and the range of vibration responses. The controller reports results of the determined global stiffness of the airframe.

Another embodiment is directed to a system having one or more force generators configured to apply a vibratory load to an airframe, a plurality of sensors coupled to the airframe, and a controller. The controller is configured to set an initial vibration frequency to be applied to the airframe, and command the one or more force generators to apply a vibratory load to the airframe at the initial vibration frequency. The controller is further configured to determine a vibration response of the airframe at the initial vibration frequency using the plurality of sensors, and sweep through a range of vibration frequencies to be applied to the airframe. The controller is also configured to command the one or more force generators to apply a plurality of vibratory loads to the airframe over the range of vibration frequencies, and determine a range of vibration responses of the airframe over the range of vibration frequencies using the plurality of sensors. Additionally, the controller is configured to determine a global stiffness of the airframe based on the vibration response and the range of vibration responses, and report results of determining the global stiffness of the airframe.

Another embodiment is directed to a system having a first inertial measurement unit located at a nose section of an airframe of an aircraft. A second inertial measurement unit is located at an extending tail of the airframe. A controller is configured to measure an angular deflection of the airframe during flight based on a relative difference between measurements from the first inertial measurement unit and the second inertial measurement unit. The controller is further configured to determine a global stiffness of the airframe based on the angular deflection of the airframe in combination with a load state of the aircraft and to report results of determining the global stiffness of the airframe.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION OF THE INVENTION

Figure 1:
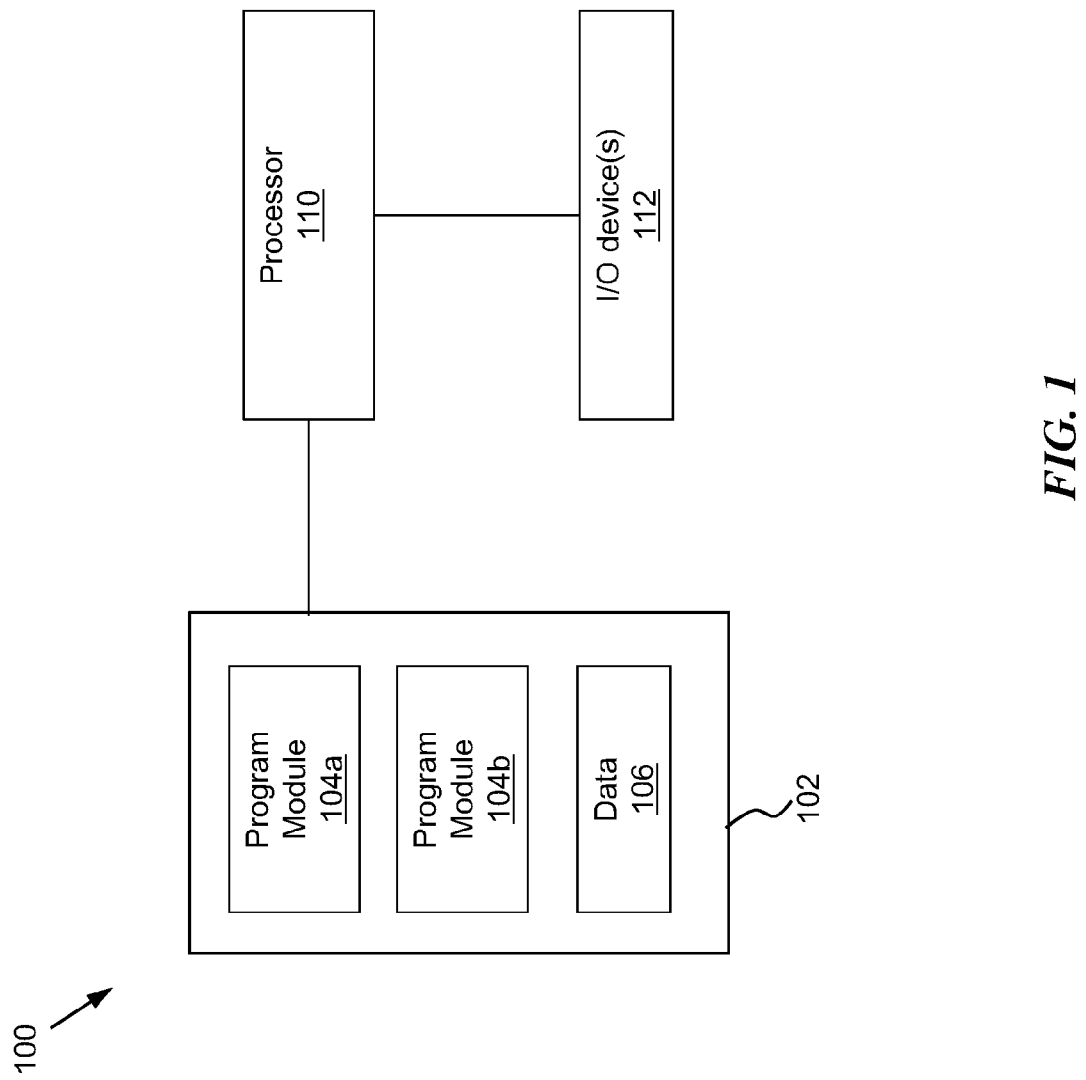
FIG. 1 is a schematic block diagram illustrating an exemplary computing system according to an embodiment of the invention.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of systems and methods are described for providing global airframe health characterization. Rather than performing vibration analysis to determine only localized component-level health, global airframe health can be determined separately or in combination with component-level health. When an aircraft, such as a rotorcraft, is in flight there is significant vibrational energy, but there is also significant noise in airframe vibrations due to variations from rotors and other aerodynamic loads. Monitoring vibration while in flight can be useful, but it may be difficult to determine whether vibrations are a result of operational conditions or damage to the airframe, as the vibratory energy is not well controlled. On a landing surface, e.g., the ground, there is very little noise, but also very little energy available to check the structural health of the airframe. Vibration monitoring systems may use piezo-electric devices to both input and receive vibration data. Piezo-electric devices have a limited range of effectiveness, and thus can provide localized or zonal information but are not typically effective for the entire airframe. Exemplary embodiments take advantage of existing active vibration control (AVC) force generators on the aircraft to provide controlled vibration excitation to the entire airframe while on a landing surface.

An AVC system is typically used while an aircraft, such as a rotorcraft, is in flight to attenuate particular vibration frequencies. In exemplary embodiments, while on a landing surface, in a pre-flight or diagnostic mode, the AVC system is used to force vibrations in a precisely controlled manner and at a variable frequency to provide significant excitation energy and low noise over a range of vibration frequencies to characterize global stiffness of the aircraft airframe. The global stiffness and changes in the global stiffness can be used as an indication of overall aircraft health or damage level. Vibrations induced by the AVC system may be detected using a number of existing sensors that are associated with the AVC system and other aircraft monitoring subsystems. A transfer function can be derived from vibration response data over a range of frequencies to compare relative to a nominal design value or relative to a baseline value of the airframe. The global stiffness and/or other health characteristics can be reported to a pilot accessible interface and/or maintenance system.

Referring to FIG. 1, an exemplary computing system 100 implemented on a rotary wing aircraft 200 (FIG. 2) is shown. The system 100 is shown as including a memory 102. The memory 102 may store executable instructions. The executable instructions may be stored or organized in any manner and at any level of abstraction, such as in connection with one or more processes, routines, methods, etc. As an example, at least a portion of the instructions is shown in FIG. 1 as being associated with a first program module 104a and a second program module 104b. The memory 102 may include random access memory (RAM), read only memory (ROM), or other electronic, optical, magnetic, or a combination of RAM, ROM, or other computer readable medium in the same or different locations connected over a network.

The memory 102 may be configured to store data 106. Data 106 may include data originating from one or more sources. The data 106 may pertain to one or more parameters, such as a stored baseline values, nominal design values, thresholds, limits, historical data, etc.

The instructions stored in the memory 102 may be executed by one or more processors, such as a processor 110. The processor 110 can be any type of processing circuitry known in the art, such as a microprocessor, microcontroller, digital signal processor, programmable logic device, application specific integrated circuit, field programmable gate array, or the like. The processor 110 may be configured to process the data 106. It is to be understood that the data 106 may be stored on separate media from the program modules 104a, 104b.

The processor 110 may be coupled to one or more input/output (I/O) devices 112. In some embodiments, the I/O device(s) 112 may include one or more of a sensor, actuator, communication interface, keyboard or keypad, a touchscreen or touch panel, a display screen, a microphone, a speaker, a mouse, a button, a remote control, a joystick, a printer, etc. The I/O device(s) 112 may be configured to provide an interface to allow a user or another entity (e.g., another computing entity) to interact with the system 100. The I/O device(s) 112 may also be configured to transmit or receive sensor data and/or commands to the processor 110.

The system 100 is illustrative. In some embodiments, one or more of the entities may be optional. In some embodiments, additional entities not shown may be included. In some embodiments, the entities may be arranged or organized in a manner different from what is shown in FIG. 1. One or more of the entities shown in FIG. 1 may be associated with one or more of the devices or entities described herein.

The program modules 104a and 104b may be configured to execute in different operational modes of the system 100. For example, the first program module 104a may be executed during a flight or normal operation mode of the system 100, while the second program module 104b may execute during a built-in test or maintenance mode of the system 100.

Figure 2:
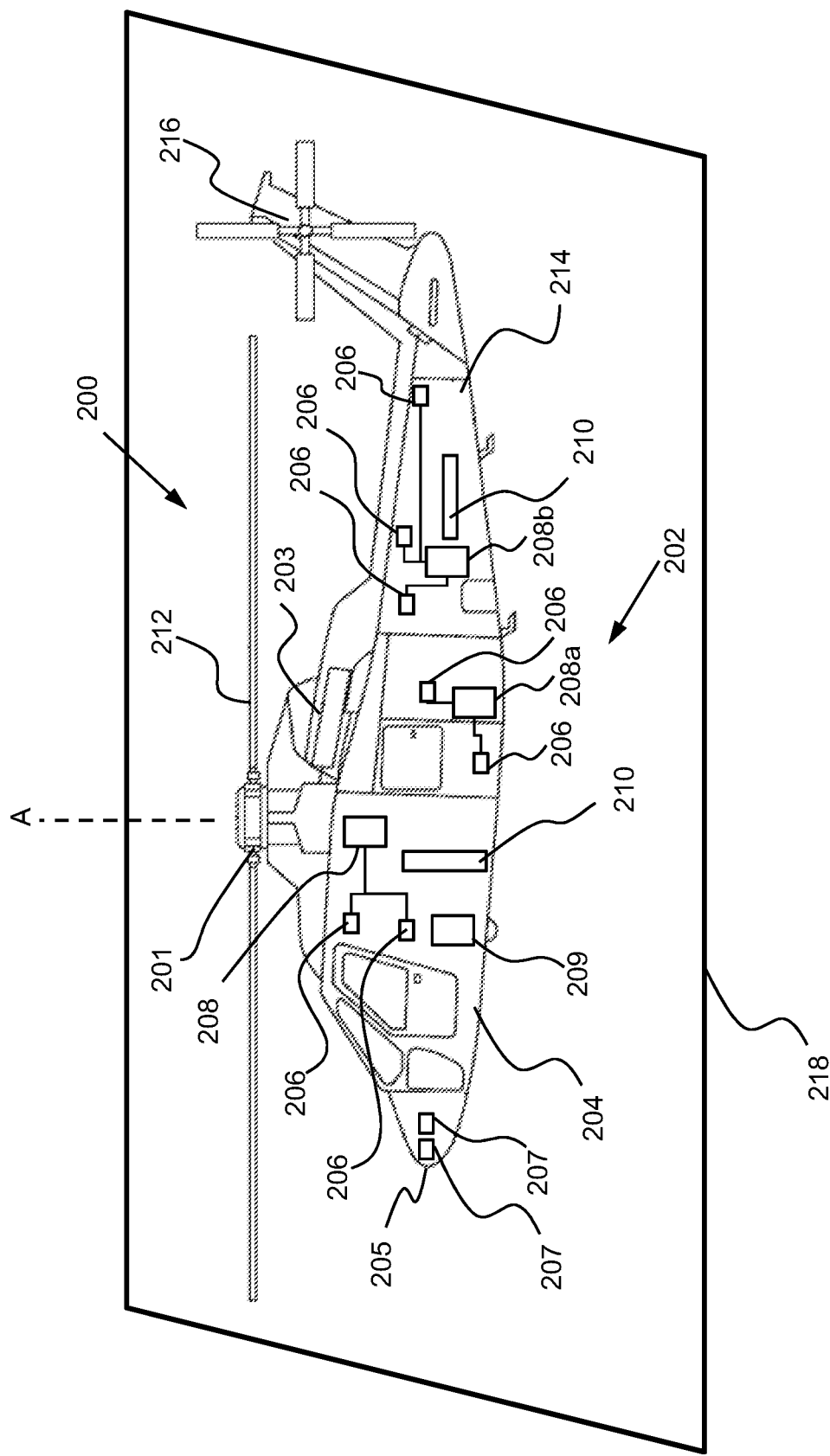
FIG. 2 illustrates a system for providing global airframe health characterization on a rotorcraft according to an embodiment of the invention.

FIG. 2 illustrates a system 202 for global airframe health characterization on a rotary wing aircraft (or rotorcraft) 200 according to an embodiment of the invention. The system 202 may be implemented in connection with the system 100 of FIG. 1 on aircraft 200 as illustrated, but the invention is not limited thereto.

As illustrated in FIG. 2, aircraft 200 includes an airframe 204 with an extending tail 214 and a tail rotor 216 located thereon. While the embodiment of the aircraft 200 described herein is a rotorcraft including an extending tail 214 and tail rotor 216, it is to be appreciated that the disclosure herein may be applied to other types of helicopters, as well as aircraft 200 of other configurations. A main rotor assembly 201 is located at the airframe 204 and rotates about a main rotor axis A. The main rotor assembly 201 is driven by one or more engines 203 which cause rotation of blades 212 to provide lift and thrust to the airframe 204. The airframe 204 is lifted by the main rotor assembly 201 and houses sensors 206, actuators 210, and controller 208. Not shown for simplicity are other elements associated with the aircraft 200, such as an engine transmission system including a gearbox, etc. The rotation of the main rotor assembly 201 and the associated blades 212 may cause vibratory loads to be experienced by the airframe 204. To suppress vibration of the airframe 204 resulting from, for example, rotation of the main rotor assembly 201 about the main rotor axis A, a number of AVC actuators 210 are located on the airframe 204 and may be associated with one or more masses (not depicted) coupled to the airframe 204 in order to produce one or more outputs that may mitigate the impact or effect of the vibration caused by the main rotor assembly 201. In exemplary embodiments, the AVC actuators 210 are also used in an alternate mode of operation while on a landing surface 218 to force vibration of the airframe 204 such that the sensors 206 can detect the vibration, and the controller 208 can determine a health characteristic of the airframe 204 based on the detected vibration response.

The controller 208 may determine that the aircraft 200 is on the landing surface 218 based on one or more of the sensors 206, e.g., a weight-on-wheels sensor, or as a parameter received from another subsystem, such as a flight control computer 209. The flight control computer 209 may also be coupled to other onboard control and diagnostic systems, such as a pair of inertial measurement units 207 that may be located in a nose section 205 of the airframe 204. The inertial measurement units 207 can be configured to provide navigational guidance information.

The system 202 may include one or more sensors, such as sensors 206 coupled to the airframe 204. The sensors 206 may be configured to detect or measure the extent of the vibration caused by the operation and use of the blades 212, potentially as a function of a rotational speed or rotational frequency associated with the main rotor assembly 201. The sensors 206 can also be used to measure vibration induced by the actuators 210. In some embodiments, the sensors 206 may include one or more accelerometers. The sensors 206 may provide data pertaining to the vibration to controller 208. Other subsystem controllers, such as subsystem controllers 208a and 208b, are also coupled to sensors 206 to provide additional vibration data from across the airframe 204. The controller 208, subsystem controllers 208a and 208b, and flight control computer 209 may be embodiments of the system 100 of FIG. 1.

The subsystem controllers 208a and 208b are configured to provide vibration data from their respective sensors 206 to controller 208 during a global health characterization operation. In one embodiment, the controller 208 is an AVC controller, and the subsystem controllers 208a and 208b are health and usage monitoring systems (HUMS) and rotor track and balance (RTB) controllers.

The controller 208 may cause one or more commands or directives to be issued to the actuators 210 to induce vibration of the airframe 204. The actuators 210 may be force generators with one or more masses (not shown) and configured to apply a vibratory load to the airframe 204 at vibration frequency set and commanded by the controller 208. The controller 208 can sweep through a range of vibration frequencies, command the actuators 210 to apply vibratory loads to the airframe 204 over the range of vibration frequencies, and determine a range of vibration responses of the airframe 204 over the range of vibration frequencies using the sensors 206. The controller 208 determines a global stiffness of the airframe 204 based on the range of vibration responses.

Figure 3:
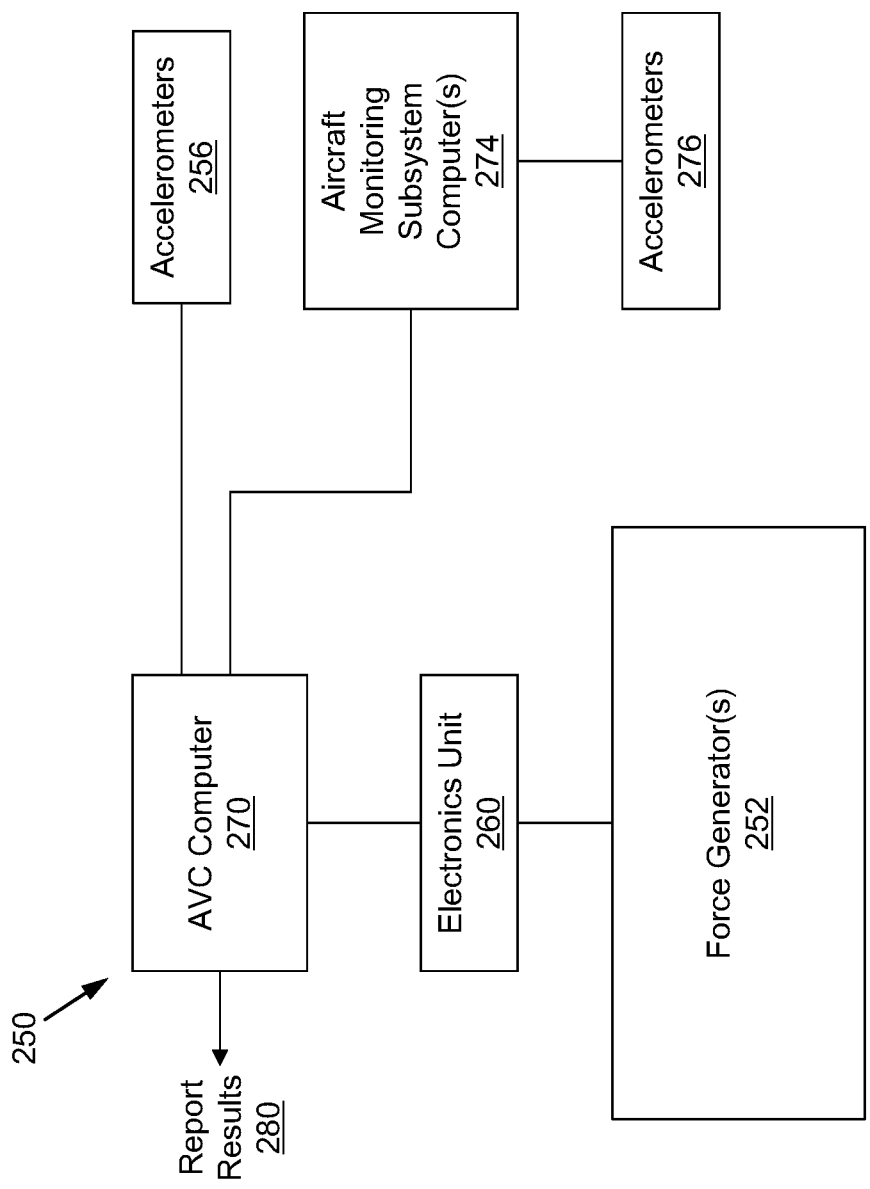
FIG. 3 illustrates a block diagram of a system for providing global airframe health characterization according to an embodiment of the invention.

Referring now to FIG. 3, a system 250 for providing global airframe health characterization is illustrated. The system 250 is an embodiment of the system 202 of FIG. 2 and includes a number of entities as described further below. The entities may be associated with, or include, one or more components or devices, such as those described herein. For example, the system 250 may include one or more of the components and devices described above with respect to the systems 100 and 202 of FIGS. 1 and 2 such as, for example, the actuators 210 and the controller 208. The system 250 can be installed on an aircraft to monitor an airframe, such as airframe 204 of aircraft 200 of FIG. 2.

As shown in FIG. 3, the system 250 may include one or more mechanical units or force generators 252. The one or more force generators 252 are embodiments of the actuators 210 of FIG. 1 and may include one or more motors and masses (not depicted). The one or more force generators 252 may be coupled to an electronics unit 260. The electronics unit 260 can provide power to the one or more force generators 252 to create and apply a vibratory load by the one or more force generators 252. The one or more force generators 252 may provide feedback to the electronics unit 260 regarding motor and/or mass location and control. The electronics unit 260 can provide directives or commands to the one or more force generators 252 to establish a vibratory load based on a desired vibration frequency.

The electronics unit 260 may be coupled to an AVC computer 270. The electronics unit 260 may provide power to the AVC computer 270. The AVC computer 270 can be configured to receive data, such as data pertaining to accelerometer readings or measurements directly from accelerometers 256 or indirectly from accelerometers 276 via one or more aircraft monitoring subsystem computers 274. Based on processing of the data, the AVC computer 270 may calculate one or more parameters, such as an amplitude, phase, force, and/or frequency that should be realized by the one or more force generators 252. The AVC computer 270 may provide such parameters to the electronics unit 260, and the electronics unit 260 may process the parameters to command the one or more force generators 252. The AVC computer 270 may be an embodiment of the controller 208 of FIG. 2, and the electronics unit 260 can be part of the controller 208 of FIG. 2 or separately implemented.

The AVC computer 270 can determine the global stiffness of an airframe, such as the airframe 204 of FIG. 2. Stiffness can be derived from vibration data using a number of techniques. For example, eigenvectors that relate mass, damping, and stiffness for multiple degrees of freedom can be decomposed into a single degree of freedom problem using a coordinate transformation, where the vibration at each degree of freedom can be a linear sum of mode shapes. A frequency response model can be used across a number of frequencies to determine magnitude and/or phase over a range of vibration frequencies to derive a transfer function that relates mass, damping, and stiffness to frequencies. Once a global stiffness and/or transfer function is determined for the airframe 204 of FIG. 2, various threshold based comparisons or relative value comparisons can be performed to determine a level of damage to the airframe 204. Values such as the global stiffness and level of damage can be reported as results 280 to a flight deck of the aircraft 200 of FIG. 2 or to on-board or ground-based maintenance equipment. The level of damage can be used as an indicator that inspection or servicing of the aircraft 200 of FIG. 2 is needed.

The systems 202 and 250 of FIGS. 2 and 3 are illustrative. In some embodiments, one or more of the entities may be optional. In some embodiments, additional entities not shown may be included. In some embodiments, the entities may be arranged or organized in a manner different from what is shown in FIGS. 2 and 3. In some embodiments, the entities may be at least partially combined.

Figure 4:
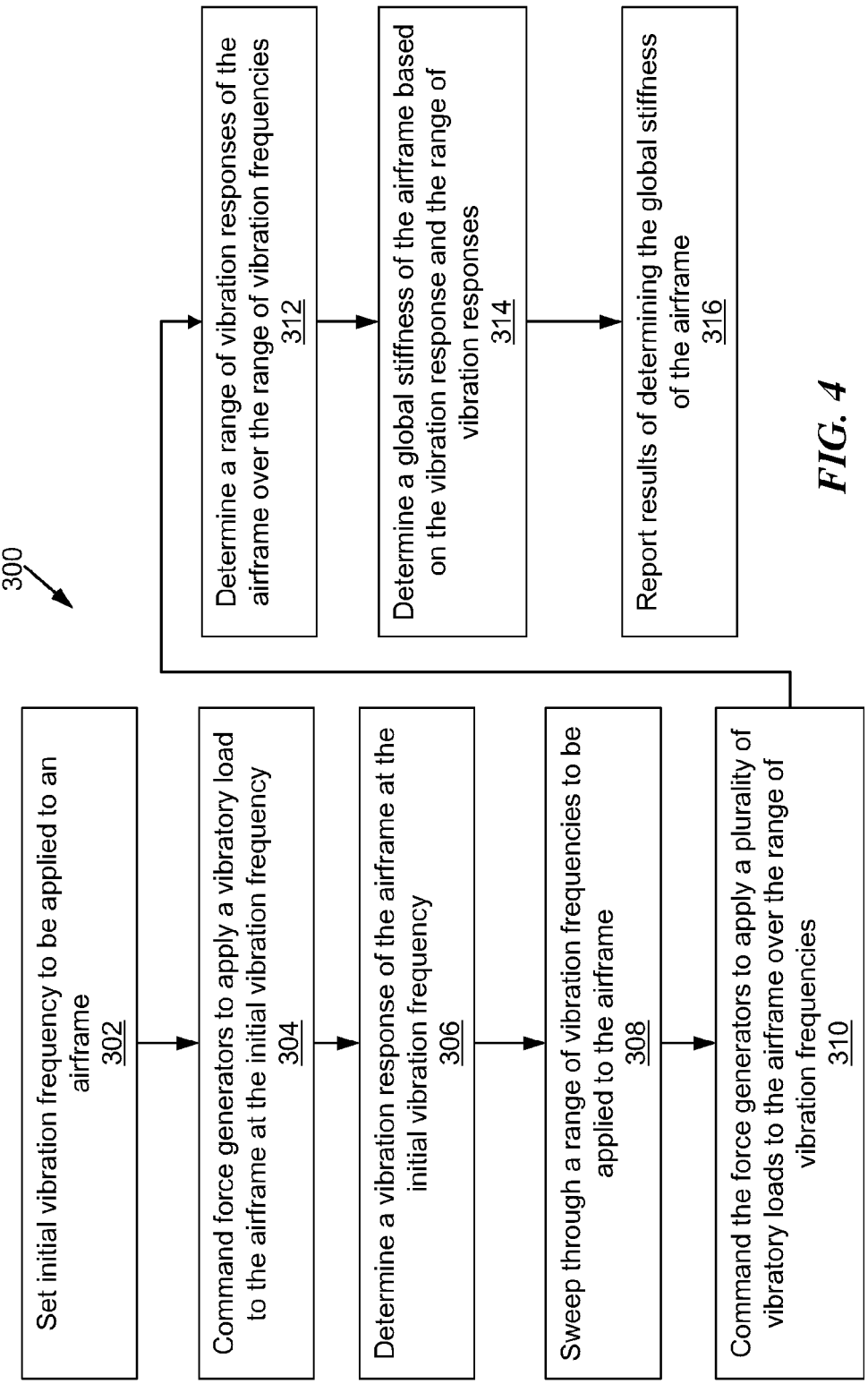
FIG. 4 is a flow chart of an exemplary method according to an embodiment of the invention.

Turning to FIG. 4 with continued reference to FIGS. 1-3, a flow chart of an exemplary method 300 is shown. The method 300 may be executed in connection with one or more entities, components, devices, or systems, such as those described herein. The method 300 may be used to provide global airframe health characterization.

At block 302, a controller 208, such as the AVC computer 270, sets an initial vibration frequency to be applied to an airframe 204. As described in reference to FIGS. 1 and 2, the controller 208 can be a system 100 that includes a processor 110 configured to perform a number of actions.

At block 304, the controller 208 commands one or more actuators 210, such as the one or more force generators 252, to apply a vibratory load to the airframe 204 at the initial vibration frequency. The one or more force generators 252 may be components of an active vibration control system configured to attenuate vibration of the airframe 204 while in flight and to provide a source of vibration excitation for global airframe health characterization while on the ground, i.e., on landing surface 218.

At block 306, the controller 208 determines a vibration response of the airframe 204 at the initial vibration frequency using a plurality of sensors 206. The sensors 206 can be accelerometers 256 and/or accelerometers 276. The sensors 206 are distributed throughout the airframe 204 and may be associated with a plurality of aircraft monitoring subsystems, such as subsystem controllers 208a and 208b or aircraft monitoring subsystem computers 274. Data for at least one of the sensors 206 from one or more of the aircraft monitoring subsystems can be received at the controller 208 and used to determine a vibration response. A frequency domain transform, such as a discrete Fourier transform or a fast Fourier transform, can be used to convert time-based sensor data into frequency data including magnitude and phase values at the initial vibration frequency and other frequencies.

At block 308, the controller 208 sweeps through a range of vibration frequencies to be applied to the airframe 204. A number of vibration frequencies can be selected to provide a substantial number of data points and increase overall accuracy of globally assessed values.

At block 310, the controller 208 commands the one or more force generators 252 via electronics unit 260 to apply a plurality of vibratory loads to the airframe 204 over the range of vibration frequencies.

At block 312, the controller 208 determines a range of vibration responses of the airframe 204 over the range of vibration frequencies using the plurality of sensors 206, such as accelerometers 256 and/or accelerometers 276. Again, frequency domain transforms, such as discrete Fourier transforms or fast Fourier transforms, can be used to convert time-based sensor data into frequency data including magnitude and phase values for the range of vibration frequencies and other frequencies.

At block 314, the controller 208 determines a global stiffness of the airframe 204 based on the vibration response and the range of vibration responses. Global stiffness can be derived from the responses according to known relationships between mass, stiffness, and damping of the airframe 204. Calculations can support multiple degrees of freedom. The controller 208 can also derive a transfer function based on the vibration response and the range of vibration responses. By comparing the transfer function to a nominal design value for the airframe 204, a level of damage to the airframe 204 can be determined based on a difference between the transfer function and the nominal design value. Alternatively, by comparing the transfer function to a stored baseline value of the airframe 204, a level of damage to the airframe 204 can be determined based on a difference between the transfer function and the stored baseline value. The baseline value can be established based on a request. For example, upon receiving a request to establish a new baseline value of the airframe 204, the controller 208 may record the transfer function as the new baseline value of the airframe 204 as part of data 106. By comparing the global stiffness of the airframe 204 to a threshold value, a level of damage to the airframe 204 may be determined based on a difference between the global stiffness and the threshold value.

At block 316, the controller 208 reports results 280 of determining the global stiffness of the airframe 204 for global airframe health characterization. Results 280 may be provided to a flight deck of the aircraft 200 and/or to another on-board or ground-based maintenance system.

The method 300 is illustrative and may be performed on the aircraft 200 while the aircraft 200 is positioned on a landing surface 218. In some embodiments, one or more of the blocks or operations may be optional. In some embodiments, additional blocks or operations not shown may be included. In some embodiments, the blocks or operations may execute in an order or sequence different from what is shown in FIG. 4. Some blocks may be combined, e.g., including the initial vibration frequency as part of the range of vibration frequencies.

Figure 5:
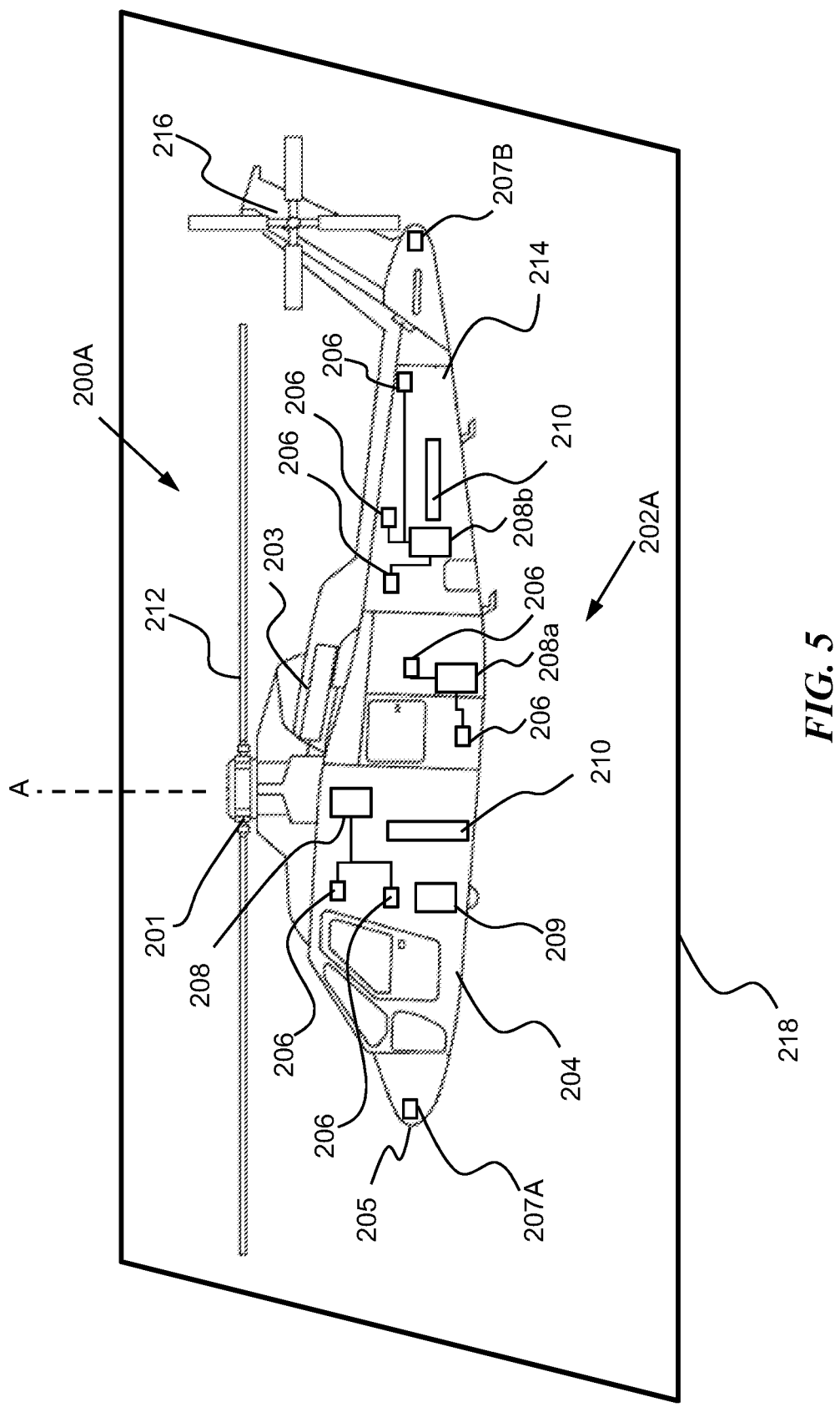
FIG. 5 illustrates a system for providing global airframe health characterization on a rotorcraft according to another embodiment of the invention.

FIG. 5 illustrates a system 202A for providing global airframe health characterization on a rotorcraft according to another embodiment. Aircraft 200A of FIG. 5 is substantially similar to the aircraft 200 of FIG. 2 as previously described. For example, similar to the aircraft 200, the aircraft 200A includes an airframe 204 with a nose section 205, an extending tail 214 and a tail rotor 216 located thereon. The aircraft 200A also includes, a main rotor assembly 201, main rotor axis A, one or more engines 203, sensors 206, controller 208, subsystem controllers 208a and 208b, flight control computer 209, AVC actuators 210, and blades 212. Rather than using inertial measurement units, such as the inertial measurement units 207 of FIG. 2, for navigation only, exemplary embodiments can use inertial measurement units for global airframe health characterization while the aircraft 200A is in flight.

The system 202A includes a first inertial measurement unit 207A located at the nose section 205 of the airframe 204 of the aircraft 200A. A second inertial measurement unit 207B may be located at the extending tail 214 of the airframe 204. As known in the art, the inertial measurement units 207A and 207B can include any combination of accelerometers, gyroscopes, magnetometers and the like to compute position in up to six degrees of freedom (x, y, z, $\Theta_x$, $\Theta_y$, $\Theta_z$). Integrating sensed acceleration over time with estimated gravity (if needed) can yield a current velocity, which may be integrated to calculate a current position for each of the first and second inertial measurement units 207A and 207B. The inertial measurement units 207A and 207B may operate in conjunction with a global positioning system (GPS) (not depicted) when used for navigational purposes. While only two inertial measurement units 207A and 207B are depicted in FIG. 5, it will be understood that additional inertial measurement units can be included in the aircraft 200A.

A controller, such as the flight control computer 209, can be configured to measure an angular deflection of the airframe 204 during flight based on a relative difference between measurements from the first inertial measurement unit 207A and the second inertial measurement unit 207B. The controller, such as the flight control computer 209, is further configured to determine a global stiffness of the airframe 204 based on the angular deflection of the airframe 204 in combination with a load state of the aircraft 200A and to report results of determining the global stiffness of the airframe 204. To further enhance global airframe health characterization for in-flight as well as ground-based global airframe health characterization, similar to the system 202 of FIG. 1, the system 202A of FIG. 5 can use the AVC actuators 210 to provide a source of vibration excitation for global airframe health characterization while on the ground, i.e., on landing surface 218. Accordingly, when the aircraft 200A is positioned on landing surface 218, the system 202A of FIG. 5 can also be configured to: set an initial vibration frequency to be applied to the airframe 204, command one or more force generators 252 of FIG. 3 to apply a vibratory load to the airframe 204 at the initial vibration frequency, determine a vibration response of the airframe 204 at the initial vibration frequency using the plurality of sensors 206, sweep through a range of vibration frequencies to be applied to the airframe 204, command the one or more force generators 252 of FIG. 3 to apply a plurality of vibratory loads to the airframe 204 over the range of vibration frequencies, determine a range of vibration responses of the airframe 204 over the range of vibration frequencies using the plurality of sensors 206, and determine a global stiffness of the airframe 204 based on the vibration response and the range of vibration responses.

Embodiments have been described in connection with the operation of aircraft or rotorcraft. Aspects of this disclosure may be applied in other contexts. For example, aspects of this disclosure may be used in any environment where global health needs to be characterized for a large structure.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
   determining, by a controller comprising a processor, that an aircraft is on a landing surface based on a weight-on wheels sensor reading;
   setting, by the controller, an initial vibration frequency to be applied to an airframe of the aircraft;
   commanding, by the controller, one or more force generators to apply a vibratory load to the airframe at the initial vibration frequency based on determining that the aircraft is on the landing surface and the aircraft is in a pre-flight or diagnostic mode, wherein the one or more force generators are components of an active vibration control system configured to attenuate vibration of the aircraft while the aircraft is in a flight or normal operation mode and to characterize a global stiffness of the airframe while the aircraft is in the pre-flight or diagnostic mode and positioned on the landing surface;
   determining, by the controller, a vibration response of the airframe at the initial vibration frequency using a plurality of sensors;
   sweeping, by the controller, through a range of vibration frequencies to be applied to the airframe;
   commanding, by the controller, the one or more force generators to apply a plurality of vibratory loads to the airframe over the range of vibration frequencies;
   determining, by the controller, a range of vibration responses of the airframe over the range of vibration frequencies using the plurality of sensors;
   determining, by the controller, the global stiffness of the airframe based on the vibration response and the range of vibration responses;
   comparing the global stiffness of the airframe to a threshold value; and
   determining a level of damage to the airframe based on a difference between the global stiffness and the threshold value; and
   reporting, by the controller, results of determining the global stiffness of the airframe.

2. The method of claim 1, further comprising deriving a transfer function, by the controller, based on the vibration response and the range of vibration responses.

3. The method of claim 2, further comprising:
   comparing the transfer function to a nominal design value for the airframe; and
   determining a level of damage to the airframe based on a difference between the transfer function and the nominal design value.

4. The method of claim 2, further comprising:
   comparing the transfer function to a stored baseline value of the airframe; and
   determining a level of damage to the airframe based on a difference between the transfer function and the stored baseline value.

5. The method of claim 4, further comprising:
   receiving a request to establish a new baseline value of the airframe; and
   recording the transfer function as the new baseline value of the airframe.

6. The method of claim 1, wherein the sensors are distributed throughout the airframe and are associated with a plurality of aircraft monitoring subsystems, and the method further comprises receiving data for at least one of the sensors from one or more of the aircraft monitoring subsystems.

7. A system comprising:
   one or more force generators configured to apply vibratory loads to an airframe of an aircraft, wherein the one or more force generators are components of an active vibration control system configured to attenuate vibration of the aircraft while the aircraft is in a flight or normal operation mode and to characterize a global stiffness of the airframe while the aircraft is in a pre-flight or diagnostic mode and positioned on a landing surface;
   a plurality of sensors coupled to the airframe; and
   a controller configured to:
      determine that the aircraft is on the landing surface based on a weight-on wheels sensor reading;
      set an initial vibration frequency to be applied to the airframe;
      command the one or more force generators to apply a vibratory load to the airframe at the initial vibration frequency based on determining that the aircraft is on the landing surface and the aircraft is in the pre-flight or diagnostic mode;
      determine a vibration response of the airframe at the initial vibration frequency using the plurality of sensors;
      sweep through a range of vibration frequencies to be applied to the airframe;
      command the one or more force generators to apply a plurality of vibratory loads to the airframe over the range of vibration frequencies;
      determine a range of vibration responses of the airframe over the range of vibration frequencies using the plurality of sensors;
      determine the global stiffness of the airframe based on the vibration response and the range of vibration responses;
      compare the global stiffness of the airframe to a threshold value; and
      determine a level of damage to the airframe based on a difference between the global stiffness and the threshold value; and
      report results of determining the global stiffness of the airframe.

8. The system of claim 7, wherein the controller is further configured to derive a transfer function based on the vibration response and the range of vibration responses.

9. The system of claim 8, wherein the controller is further configured to compare the transfer function to a nominal design value for the airframe, and determine a level of damage to the airframe based on a difference between the transfer function and the nominal design value.

11. The system of claim 8, wherein the controller is further configured to compare the transfer function to a stored baseline value of the airframe, and determine a level of damage to the airframe based on a difference between the transfer function and the stored baseline value.

11. The system of claim 10, wherein the controller is further configured to receive a request to establish a new baseline value of the airframe, and record the transfer function as the new baseline value of the airframe.

12. The system of claim 7, wherein the sensors are distributed throughout the airframe and are associated with a plurality of aircraft monitoring subsystems, and the controller is further configured to receive data for at least one of the sensors from one or more of the aircraft monitoring subsystems.

\* \* \* \* \*